US006747260B2

(12) United States Patent
Miramonti et al.

(10) Patent No.: US 6,747,260 B2
(45) Date of Patent: Jun. 8, 2004

(54) METHOD AND APPARATUS FOR THREE-DIMENSIONAL COLOR SCANNING

(75) Inventors: John L. Miramonti, West Lebanon, NH (US); Frederick E. Mueller, San Francisco, CA (US)

(73) Assignee: WaveWorx Inc., Tiburon, CA (US)

( * ) Notice: Subject to any disclaimer, the term of this patent is extended or adjusted under 35 U.S.C. 154(b) by 0 days.

(21) Appl. No.: 10/208,971

(22) Filed: Jul. 30, 2002

(65) Prior Publication Data

US 2002/0190190 A1 Dec. 19, 2002

Related U.S. Application Data

(63) Continuation of application No. 09/945,133, filed on Aug. 31, 2001, now abandoned, and a continuation of application No. 09/236,727, filed on Jan. 25, 1999, now Pat. No. 6,288,385, which is a continuation of application No. 08/738,437, filed on Oct. 25, 1996, now Pat. No. 5,864,640.

(51) Int. Cl.[7] .............................................. H01L 27/00
(52) U.S. Cl. ..................................... 250/208.1; 250/235
(58) Field of Search ............................... 250/208.1, 234, 250/235, 226, 559.4, 559.22, 223 B, 223 R; 356/376, 379; 382/312, 203–205

(56) References Cited

U.S. PATENT DOCUMENTS

| | | |
|---|---|---|
| 4,758,730 A | 7/1988 | Bazin et al. |
| 4,792,696 A | 12/1988 | Kender et al. |
| 4,912,336 A | 3/1990 | Nayar et al. |
| 5,511,153 A | 4/1996 | Azarbayejani et al. |
| 5,559,334 A | 9/1996 | Gupta et al. |
| 5,611,000 A | 3/1997 | Szeliski et al. |
| 5,671,157 A * | 9/1997 | Saito ............................ 345/419 |
| 5,818,959 A | 10/1998 | Webb et al. |
| 5,917,937 A | 6/1999 | Szeliski et al. |
| 6,009,188 A | 12/1999 | Cohen et al. |
| 6,009,190 A | 12/1999 | Szeliski et al. |

OTHER PUBLICATIONS

Debevec, Taylor, Malik; Modeling and Rendering Architecture from Photographs: A hybrid geometry and image based approach, Technical Report UOB//CSD–96–893; Jan. 19, 1996.
Kang, Webb, Zitnick, Kanade; A Multibaseline Stereo System Active Illumination and Real–time Image Acquisition; Believed to be 1994, month unknown.
Kanade, Kano, Kiumra, Yoshida, Oda; Development of a Video–Rate Stereo Machine; Aug. 5–9, 1995.
Morita, Kanade; A sequential Factorization Method for Recovering Shape and Motion from Image Streams; Nov. 1994.
Poelman, Kanade; A Paraperspective Factorization Method for Shape and Motion Recovery; Dec. 11, 1993.
Katsushi, Ikeuchi, Sato; Determining reflectance properties of an object using range and brightness Images; Nov. 1991.

(List continued on next page.)

Primary Examiner—Que R. Le
(74) Attorney, Agent, or Firm—Edward S. Sherman

(57) ABSTRACT

The invention provides a three dimensional digital scanner which includes a multiple view detector which is responsive to a broad spectrum of visible light. The multiple view detector is operative to develop a plurality of images of a three dimensional object which is being scanned. The plurality of images are taken from a plurality of relative angles with respect to the object, and the plurality of images depict a plurality of surface portions of the object. A digital processor including a computational unit is coupled to the detector and is responsive to the plurality of images so that it develops 3-D coordinate positions and related image information for the plurality of surface portions of the object. A three dimensional image of the object to be scanned is thus developed by the digital processor. The data developed includes both shape and surface image color information.

6 Claims, 15 Drawing Sheets

OTHER PUBLICATIONS

Kang, Webb, Zitnick, Kanade; An Active Multibaseline Stereo System With Real–time Image Acquisition; Sep. 1994.

Lighting Technologies Inc.: FAQ: Photopia (Materials/Lamps), website content; Copyright 2003, month unknown.

Wei–Chao Chen; Light Field Mapping:Efficient Representation of Surface Light Fields; 2002.

Gortler, Grzesczuk, Szeliski, Cohen; The Lumigraph; Aug. 1996.

Richard Szeliski; Image Mosaicing for Tele–Reality Applications; May 1994; Cambridge, Massachusetts.

Kang, Szeliski; 3–D Scene Data Recovery Using Omnidirectional multibaseline Stereo; Oct. 1995.

Zitnick, Webb; Multi–baseline Stereo Using Surface Extraction; Nov. 24, 1996; Pittsburgh, PA.

Debevec, Taylor, Malik; Modeling and Rendering Architecture from Photographs: A hybrid geometry and image based approach; 1996, month unknown.

Sato, Ikeuchi; Reflectance Analysis for 3D Computer Graphics Model Generation; Sep. 1996; PA.

Paul Ernest Debevec; Modeling and Rendering Architecture from Photographs; Fall 1996; Berkeley, CA.

Mark J. Carlotto; Shape from Shading, website content; last updated Oct. 15, 1996.

Robert T. Collins; A Space–Sweep Approach to True Multi–Image Matching; date unknown; Amherst, MA.

* cited by examiner

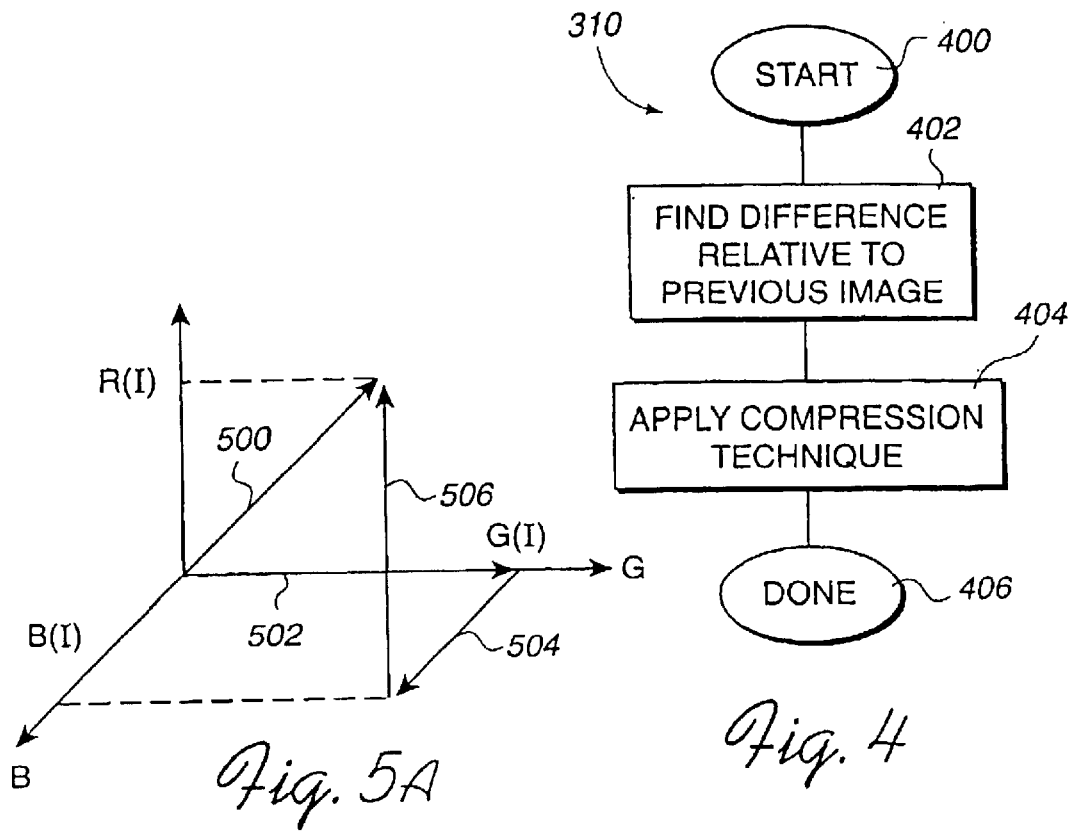
Fig. 5A
Fig. 4
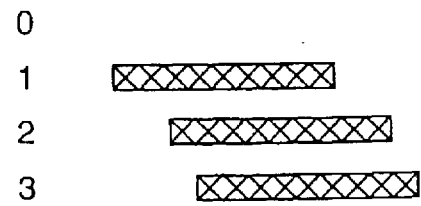
Fig. 5B
| 0 | NO | BLUE | | | |
|---|---|---|---|---|---|
| 1 | X(NC) | 8(+B) | Y(NC) | | |
| 2 | X(NC) | 2(-B) | 7(NC) | 2(+B) | Y-2(NC) |
| 3 | X+2 (NC) | 1(-B) | 7(NC) | 1(+B) | Y-1(NC) |
Fig. 5C

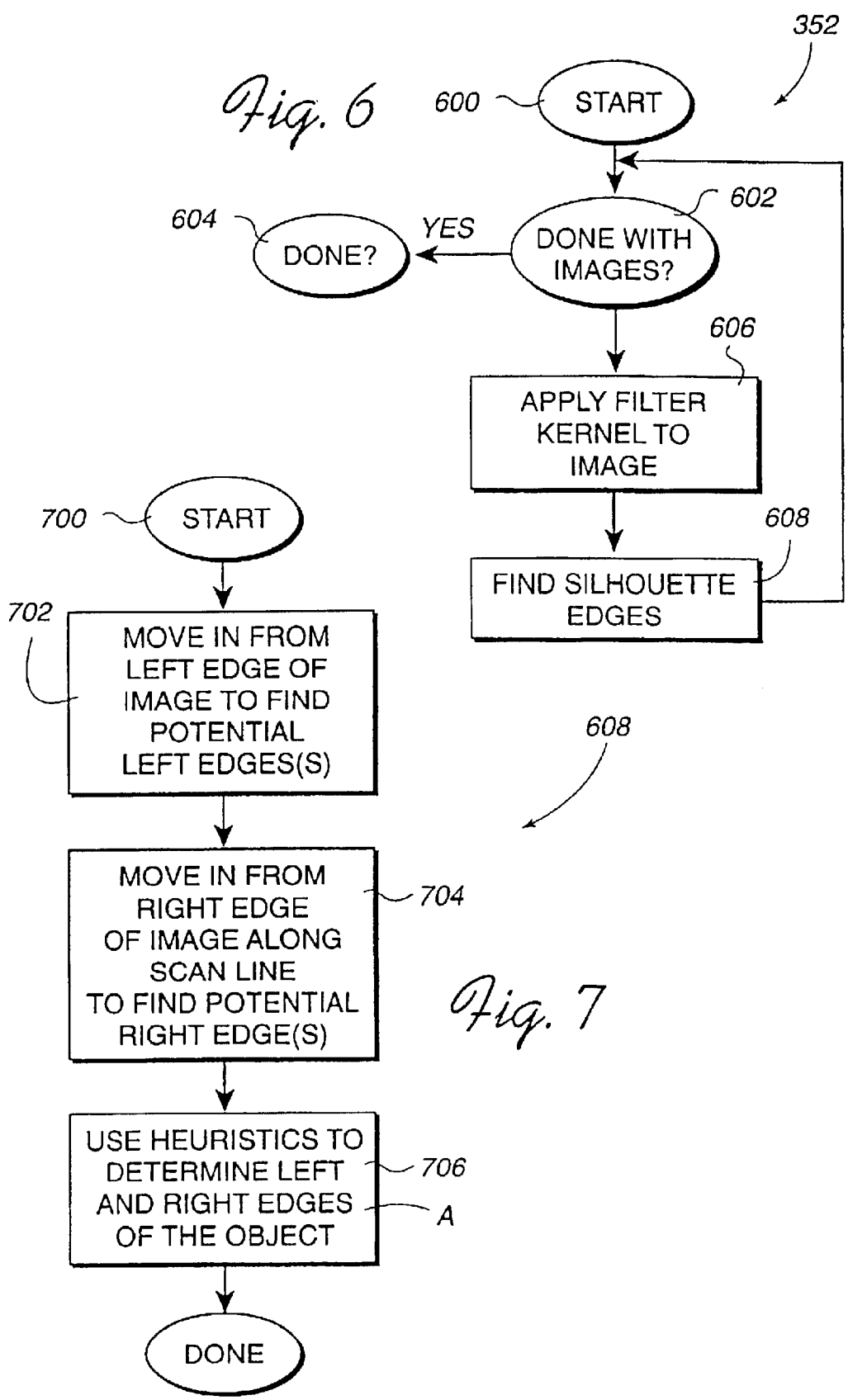

METHOD AND APPARATUS FOR THREE-DIMENSIONAL COLOR SCANNING

CROSS REFERENCES TO RELATED APPLICATIONS

This is a continuation of U.S. application Ser. No. 09/945,133 filed Aug. 31, 2001, now abandoned and of U.S. application Ser. No. 09/236,727 filed Jan. 25, 1999, now U.S. Pat. No. 6,288,385 which is a continuation of Application No. 08/738,437, filed Oct. 25, 1996, now U.S. Pat. No. 5,864,640. The disclosure of the aforementioned U.S. application Ser. No. 09/945,133 (hereinafter, "Referenced Application") is hereby incorporated by reference as if filly set forth herein.

TECHNICAL FIELD

This invention relates generally to optical scanners, and more particularly to optical scanners for providing a digital representation of three dimensional objects.

BACKGROUND ART

Methods for successfully obtaining two dimensional ("2-D") color image data for objects have been developed. This process is commonly known as two dimensional scanning or digitizing. When an object is scanned, a digital data file is created which contains image data including color information which is associated with a set of two dimensional points or coordinates. The color information is obtained by an optical detector or set of optical detectors that are typically organized in a one or two dimensional array.

Matching the color information with the correct two dimensional point or location is not a significant problem in two dimensional scanning since the two dimensional point on which the optical detector is focused is the same point that is associated with the color information obtained by the detector. The color information is mislocated only to the extent that there is some error in the location of the point on which the detector is focused (e.g. an error introduced by the optical system) and that error can readily be minimized.

The problem of associating color information with three dimensional ("3-D") objects is not so easily solved. This is because prior art methods obtain color information with a two dimensional scanning method, while position information is obtained by a three dimensional scanning method. The mapping of the 2-D color information to the 3-D position information is a complicated process which is prone to significant error.

Many methods exist for obtaining the three dimensional location of the surface points of the object. One such method is a system which uses a laser range finder to scan the object and record the distance between the known three dimensional location of the range finder and the measured location of the surface of the object. The result of using this method or other methods of generating three dimensional surface models is a set of three dimensional points which accurately represent the surface of the object. A characteristic of this method and other methods of obtaining a three dimensional surface model is that it is inherently monochromatic, that is, no color information is obtained in the process. If three dimensional color information is desired, then it must be generated by somehow combining or conformally mapping the two dimensional color information onto the three dimensional surface model.

The problem of conformally mapping the two dimensional color information onto the three dimensional surface model is difficult and it is common for mismatching of color information with the three dimensional points to occur. The problem may be visualized by imagining a white statue or bust of a person's bead and a color photograph of the same person's face. The photograph cannot simply be projected onto the bust to transfer the correct color information to the correct points on the bust or significant distortion will occur. A significant amount of judgment must be exercised in order to correctly associate the color information from the photograph with the correct surface points on the bust. Similarly, it is difficult to accurately associate color information obtained from two dimensional optical detectors with the correct points on a three dimensional surface model. Another problem in the prior art is that color information is not used to determine surface locations, which means less than the total amount of information that is available is being used. Furthermore, both a 2-D and 3-D system is required, which adds cost.

What is needed is a way of generating a set of three dimensional points representing a surface in such way that the three dimensional points are already associated with color data so that conformally mapping separately generated color data onto the set of three dimensional surface points is not necessary. Furthermore, it is desirable to utilize all available frequencies of light to determine surface point positions to maximize the accuracy of the scanning process and to eliminate a separate 3-D scanning step.

DISCLOSURE OF THE INVENTION

Accordingly, the present invention provides a system and method for using the color information from a series of two dimensional color images to derive the three dimensional location in space of the surface points which produced the color images. Because the color information itself is used to derive the three dimensional location of the surface points, there is no need to conformally map separately generated color information onto the derived three dimensional surface points. The points are derived from color information and so are already associated with the correct color information. Also, the use of the color information increases the accuracy of the three dimensional location of the surface points.

In one embodiment, the present invention provides a three dimensional digital scanner which includes a multiple view detector which is responsive to a broad spectrum of visible light. The multiple view detector is operative to develop a plurality of images of a three dimensional object which is being scanned. The plurality of images are taken from a plurality of relative angles with respect to the object, and the plurality of images depict a plurality of surface portions of the object. A digital processor including a computational unit is coupled to the detector and is responsive to the plurality of images so that it develops 3-D coordinate positions and related image information for the plurality of surface portions of the object. A three dimensional image of the object to be scanned is thus developed by the digital processor. The data developed includes both shape and surface image color information.

In another embodiment, a three dimensional color digital scanner includes a color detector responsive to a broad spectrum of visible light to develop a plurality of images of a three dimensional object. A rotary object support having an axis of rotation allows the detector to develop a plurality of images of a three dimensional object. The plurality of images depict a plurality of surface portions of the object. A digital computer is coupled to the detector. The computer tracks patches of the surface portions of the object to determine coordinates of the patches as a function of the rotation of the rotary object support and determines radii of the patches from the axis of rotation.

In another embodiment, a method for scanning a three dimensional object includes developing a plurality of images of a three dimensional object taken from a plurality of relative angles with respect to the object. The plurality of images depict a plurality of surface portions of the object to be scanned. 3-D coordinate positions and related image information about the plurality of surface portions of the object is computed from the plurality of images such that a three dimensional image of the object is developed that includes both shape and surface image information.

In another embodiment, a method for determining three dimensional coordinates of a surface portion of an object includes obtaining a plurality of images of the surface portion of the object and identifying a trackable patch of the surface portion in an initial image. An initial set of two dimensional coordinates of the trackable patch in the initial image is determined along with at least one additional set of two dimensional coordinates of the trackable patch in another of the images. A radial coordinate of the trackable patch is determined and then a set of three dimensional coordinates of the trackable patch are determined from the radial coordinate of the trackable patch.

In another embodiment, a method for determining three dimensional coordinates of a surface portion of an object includes rotating the object about an axis of rotation so that a plurality of images of the surface portion of the object are obtained as the object is rotates about the axis of rotation. A trackable patch is identified and the two dimensional coordinates of the trackable patch are determined. The movement of the trackable patch is tracked as a function of the rotation of the object. A radial distance of the trackable patch from the axis of rotation is determined based on the movement of the trackable patch as a function of the rotation of the object and three dimensional coordinates of the surface portion of the object are derived from the coordinates of the trackable patch and the radial distance of the trackable patch from the axis of rotation.

The present inventions provides a system and method for obtaining 3-D surface information that is linked to color information without the need to conformally map 2-D color data onto a 3-D surface. The accuracy of the system is enhanced by the use of color data and the cost of the system is reduced because the 3-D surface is derived from a series of 2-D images. These and other advantages of the present invention will become apparent upon reading the following detailed descriptions and studying the various figures of the drawings.

BRIEF DESCRIPTION OF THE DRAWINGS

FIG. 4 is a flow diagram illustrating a process performed on the images before they are stored.

FIG. 5A illustrates the vector nature of the color data obtained.

FIG. 5B illustrates an example of blue color data at times 0, 1, 2, and 3 for a line of pixels.

FIG. 5C illustrates how the data can be compressed by recording only the changes in the color data.

FIG. 6 is a flow diagram illustrating a process for identifying the silhouette of the object in each image.

FIG. 7 is a flow diagram illustrating a process for finding silhouette edges along each scan line.

BEST MODES FOR CARRYING OUT THE INVENTION

Figure 1:
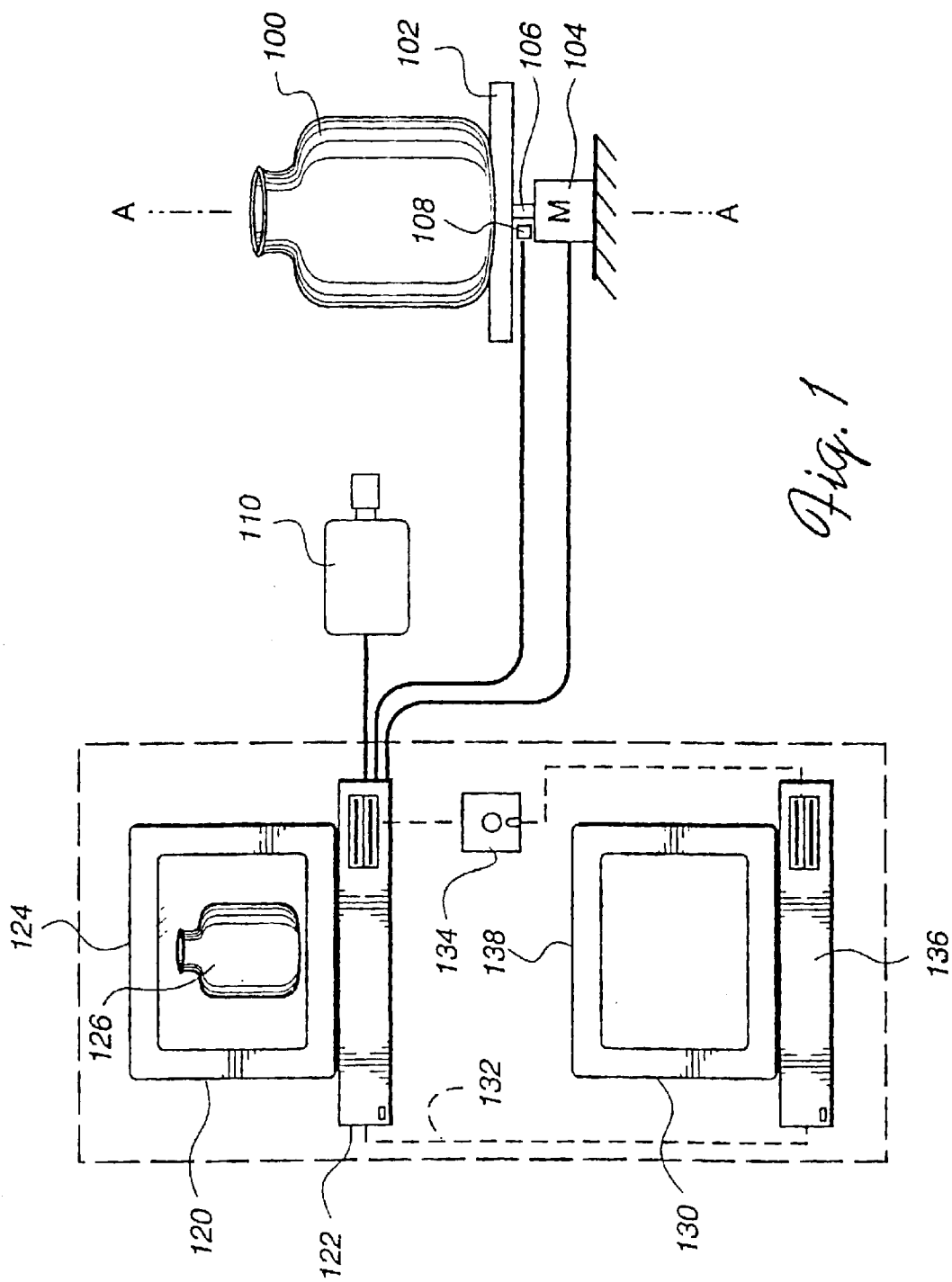
FIG. 1 illustrates a system for obtaining a series of two dimensional color images of an object and processing those images to obtain a three dimensional model of the surface of the object.

In FIG. 1, an embodiment of the present invention includes a system for obtaining a series of two dimensional color images of an object and processing those images to obtain a three dimensional model of the surface of the object. An object 100 which is to be digitized is placed on a rotatable platform 102. A motor 104 is provided to drive rotatable platform 102 via a shaft 106. A position encoder 108 detects the angular position of rotatable platform 102 and generates an electrical signal which represents the angular position of rotatable platform 102. An optical detector 110 (e.g. a color video camera) views object 100 and creates a two dimensional color image of object 100.

As object 100 is rotated by rotatable platform 102, detector 110 captures a series of color images of object 100. Each color image taken at a different time is associated with an angular rotation of object 100 about an axis of rotation, "A" which runs through shaft 106. Information about the angular position of object 100 is obtained from position encoder 108. Thus, each "snapshot" or image of object 100 taken by detector 110 from a different view is associated with data about the angle of rotation of object 100 with respect to detector 110. An image input processing system 120

("computer") controls the image acquisition process and records the acquired images along with the associated angular position data. That is, processing system 120 is connected to detector 110 and receives data for each image or snapshot taken of object 100 from detector 110, and position encoder 108 sends angular position information to processing system 120, so that processing system 120 can associate the image data from detector 110 with the angular position data taken at the same time. In other embodiments, detector 110 is a film camera and processing system 120 receives data from a digitizer which digitizes the film images from detector 110.

Processing system 120 includes a processing unit 122 and a monitor 124 and also controls motor 104. A monitor 124 can display a current image 126 being captured by detector 110 or other information about the capturing process.

Once processing system 120 has obtained a series of images, those images are transferred to an image processor 130 ("computer"). Image processor 130 can receive data from processing system 120 in a number of different ways. Image processor 130 can be directly connected to processing system 120 via direct connection 132, or data from processing system 120 can be transferred to a removable storage medium such as disk 134 which may be read by image processor 130. Processing system 120 may also transfer data to image processor 130 via the Internet or a modem connection. Image processor 130 includes processing unit 136 and also includes monitor 138.

In other embodiments, processing system 120 and image processor 130 are combined on a single computer. The advantage of separating the functions of processing system 120 and image processor 130 is that the data acquisition and storage function performed by processing system 120 and control of the data acquisition system does not require a complex or powerful processor. On the other hand, image processor 130 receives data representing a series of two dimensional images and perform complex and computationally intensive operations on that data to produce a three dimensional surface model. Image processor 130 is therefore, given current technology, likely to be a more powerful (and costly) computer than processing system 120. If that is the case, then it is economically beneficial to utilize a large number of relatively cheap processors for data acquisition and temporary storage and send data from those relatively cheap systems to a smaller number of image processors which generate the three dimensional surface model from the set of two dimensional color images.

Figure 1A:
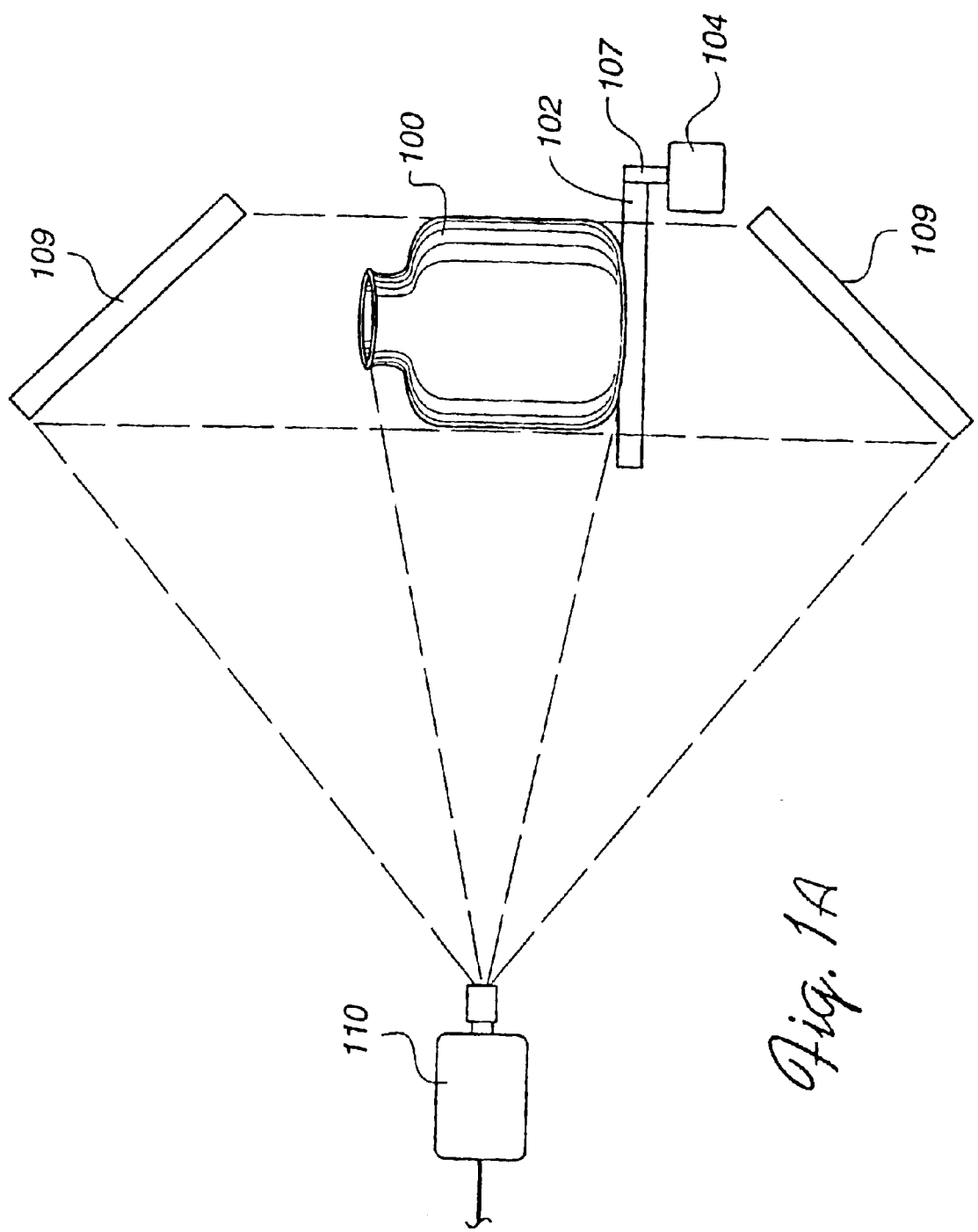
FIG. 1A illustrates an alternative embodiment of the present invention which enables the top and bottom portions of an object to be scanned.

FIG. 1A illustrates an alternative embodiment of the present invention which enables the top and bottom portions of an object to be scanned. Again, object 100 is supported by rotatable platform 102 which is driven by motor 104. In this embodiment, shaft 107 engages the edge of rotatable platform 102, so that motor 104 and shaft 107 do not obscure the image of the bottom of object 100. Rotatable platform 102 is made from a transparent material so that the bottom of object 100 may be viewed through rotatable platform 102. A set of mirrors 109 are placed within the field of view of detector 110 so that images of the top and bottom surfaces of object 100 are captured by detector 110 in addition to the side views.

Figure 1B:
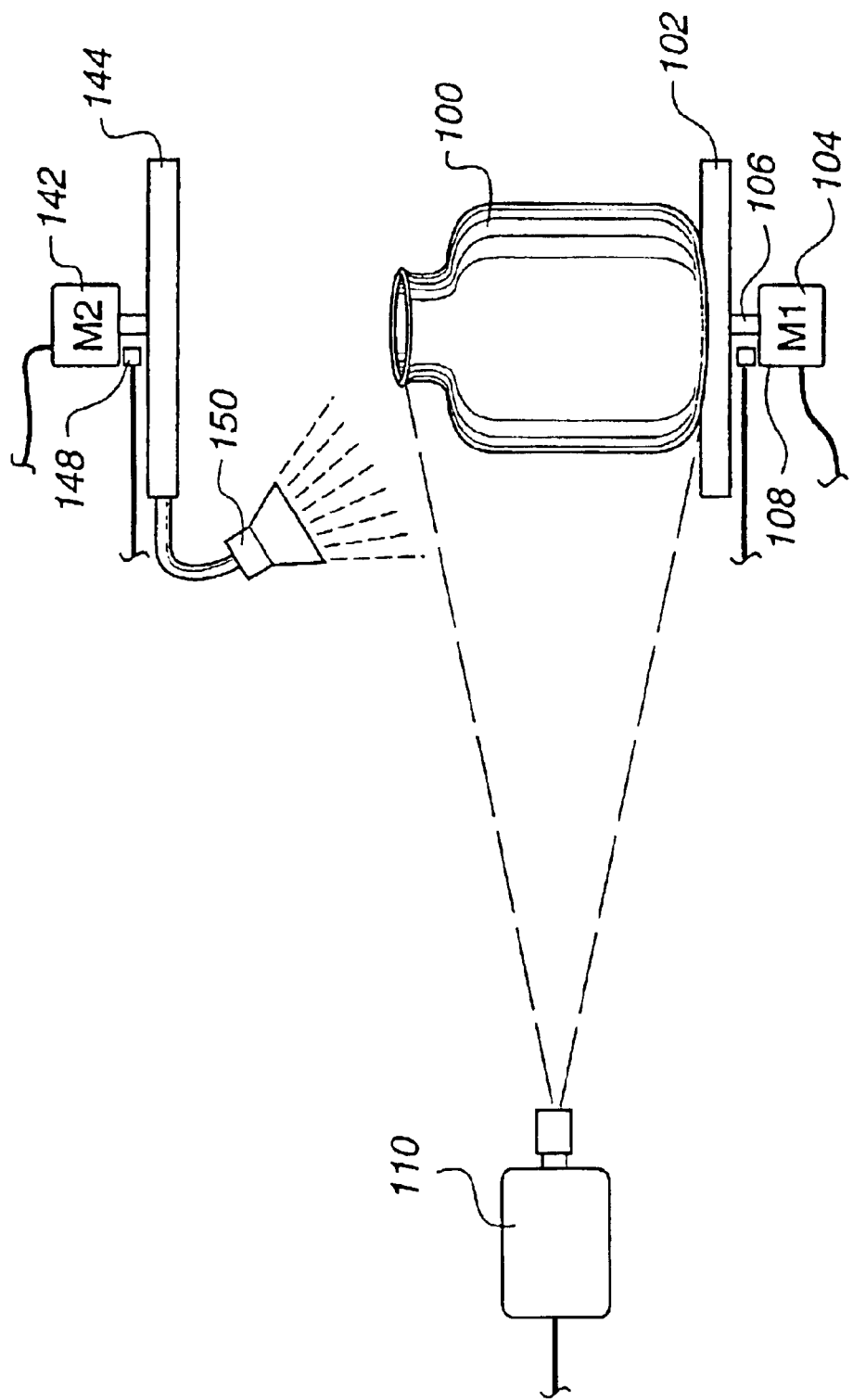
FIG. 1B illustrates another embodiment of the present invention which produces enhanced shading of an object.

FIG. 1B illustrates another embodiment of the present invention which is designed to produce contrast enhancing shading of object 100. Again, object 100 is supported by rotatable platform 102 which is driven by a motor 104 via a shaft 106. A second motor 142 also drives a rotatable platform 144 via shaft 146. Encoder 148 generates data representative of the rotational position of rotatable platform 144 and transmits that data to processing system 120. Likewise, motor 142 receives control commands from processing system 120. A light 150 is mounted on rotatable platform 144 to provide illumination of object 100. Light 150 is oriented to provide contrasting illuminated and shaded portions on object 100 which aid in the tracking of features on the surface of object 100. Because light 150 is mounted on rotatable platform 144 which is separately controllable by processing system 120, different orientations of light 150 with respect to object 100 may be checked to determine which one best enhances the surface features of object 100. When platforms 102 and 144 are rotated in a synchronized manner, the shading remains constant. Additionally, multiple sets of views of object 100 with different shadings can also be obtained by changing the relative position of platforms 102 and 144.

Figure 1C:
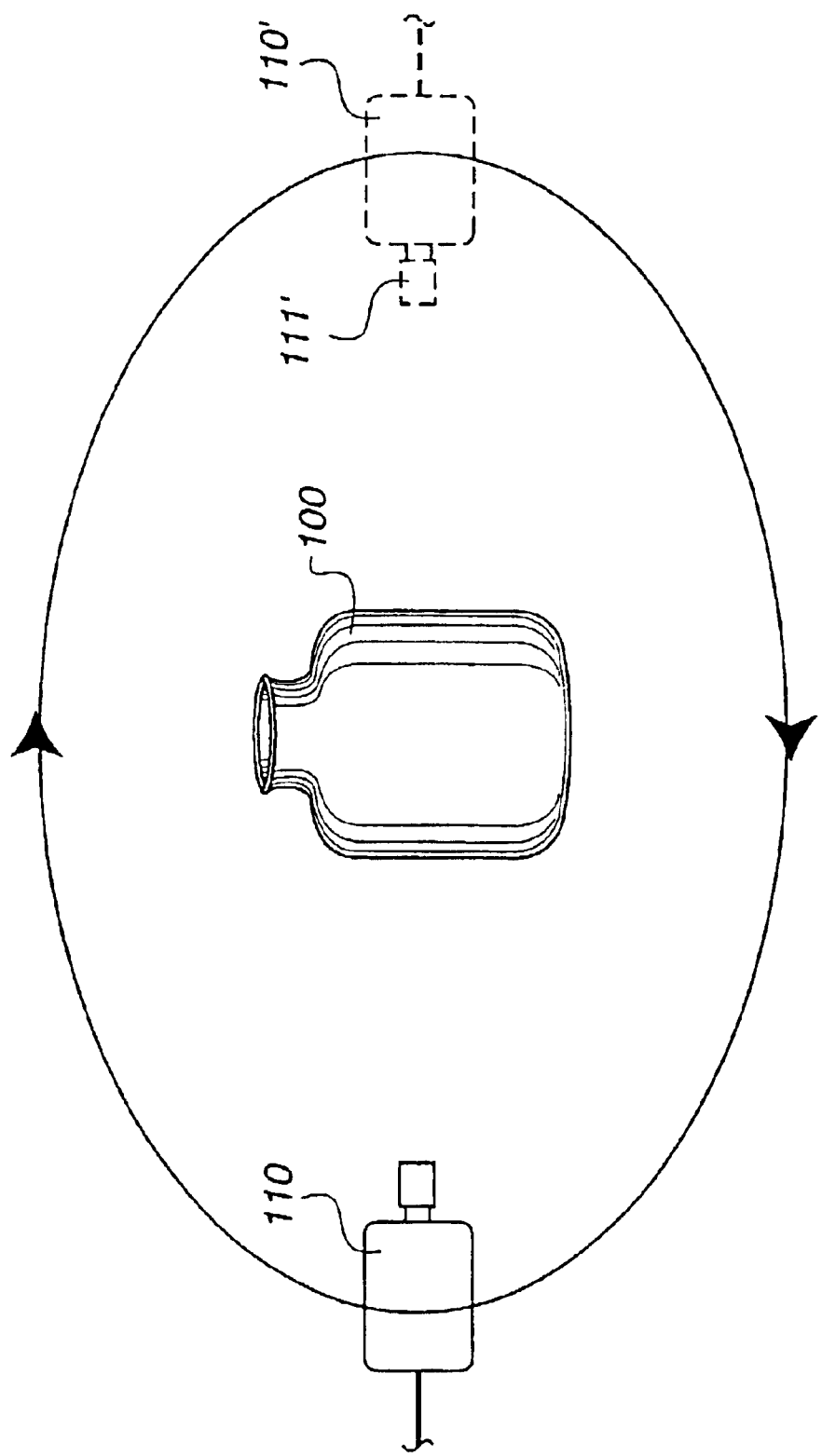
FIG. 1C illustrates an arrangement where a detector is translated about a stationary object.

FIGS. 1, 1A, and 1B each depict embodiments where in the object being imaged is rotated. In another embodiment of the present invention, the object remains stationary and the detector moves around the object. FIG. 1C illustrates an arrangement where a detector is translated about a stationary object. It should be noted that as the detector 110 is moved, the optics 111 remain pointed at the object 100. Detector 110 can be move in many ways and object 100 can be supported in many ways. In one embodiment, an unobstructed view of object 100 is obtained by suspending it from very thin wires. Detector 110 is translated about object 100. If object 100 is very large, detector 110 could be mounted on, for example, a helicopter and flown around object 100. It is not necessary that the motion of detector 110 be exactly circular around object 100. The angular and radial components of the motion of detector 110 with respect to object 100 can be computationally analyzed, as will be appreciated by those skilled in the art. As long as the position of detector 110 is measured and recorded, the relative angular position of detector 110 with respect to object 100 can be determined for each image taken by detector 110. Methods of determining the position of detector 110 include using GPS or a laser positioning system. Once the angular component of the motion is analyzed and the radial component is calculated, the system compensates for the radial component and the images generated by detector 110 can be processed similarly to the images generated by a system that includes a rotating object and a stationary detector.

Figure 1D:
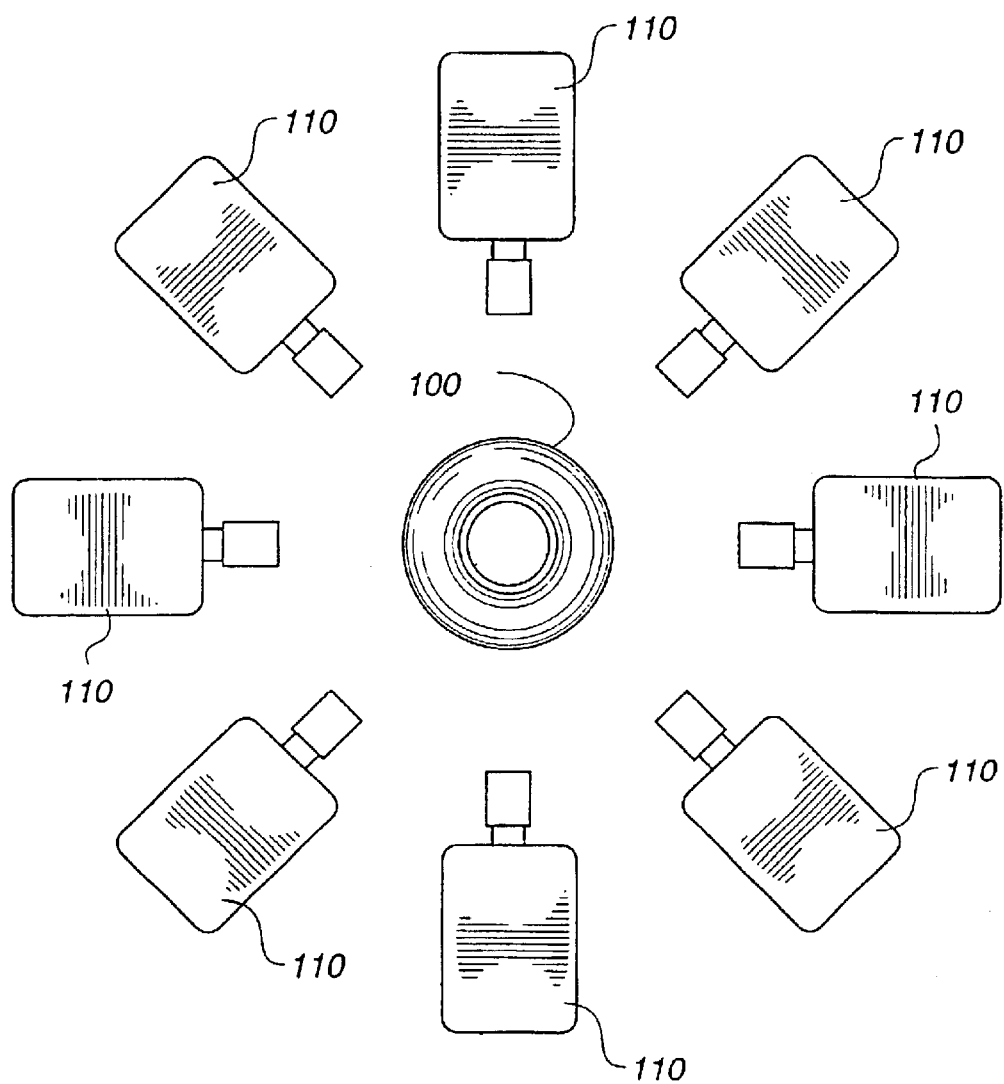
FIG. 1D illustrates an embodiment of the present invention which uses a multiple number of detectors instead of moving a single detector.

FIG. 1D illustrates an embodiment of the present invention which uses a multiple number of detectors instead of moving a single detector. A top view of object 100 is shown and set of detectors 110 are provided at different angular displacements with respect to object 100. The advantage of this embodiment is that no motion is required and the need for motors, encoders, and rotatable supports is limited. The image of object 100 captured by each detector is angularly displaced with respect the images captured by the other detectors and so the images may be processed in a similar manner as successive images taken by one moving detector. The cost of multiple detectors 110 may be less than the cost of a rotatable drive or a mechanism for moving detector 110 and recording the position of detector 110. Another advantage of this approach is that all of the images of object 100 can be created simultaneously.

FIGS. 1 through 1D depict various embodiments for creating multiple images of object 100 with object 100 and detector 110 at different relative angular displacements. Each of these systems provide two dimensional color images of object 100 observed at different angles. This two dimensional information is converted into a three dimensional surface model of object 100 by the process and apparatus of the present invention.

Figure 2:
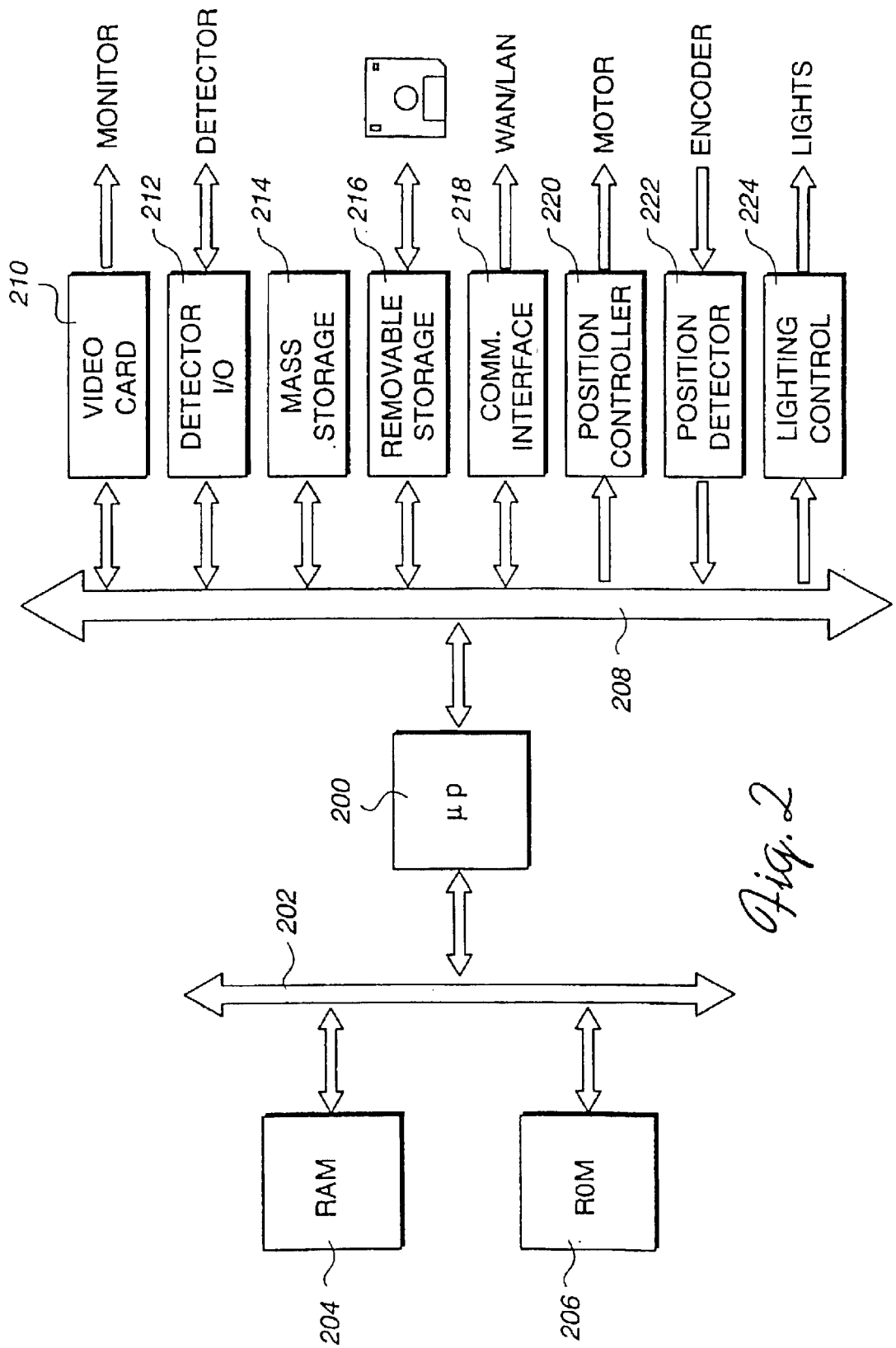
FIG. 2 illustrates in detail an architecture of an image acquisition system.

FIG. 2 illustrates in detail the architecture of processing system 120 used in some embodiments. A microprocessor 200 is connected to a memory bus 202 and memory bus 202 is connected to a RAM 204 and a ROM 206. Microprocessor 200 is also connected to an input/output ("I/O") bus 208. A video interface 210 is coupled to I/O bus 208 to control monitor 124, as is detector interface 212. Detector interface 212 buffers and processes data from the detector and also carries output commands to the detector from microprocessor 200. In certain embodiments where a moving detector is used, the detector provides its own control and records its own position. In such embodiments, the detector/processor interface need only be capable of transferring data from the detector, including both image and detector position data, to the processor storage system.

Mass storage 214 (such as a hard disk drive) is also connected to input/output bus 208 and provides storage capacity for the multiple images generated by the optical system. Removable storage 216 (such as a floppy disk drive) also provides a way of transferring data files to and from processing system 120 and another processing system. Alternatively, communications interface 218 can be used to transfer files as well. Communications interface 218 may be connected to a local area network ("LAN") or wide area network ("WAN") for communication with other workstations. Position controller 220 is connected to input/output bus 208 and provides control to a motor in embodiments where processing system 120 provides control commands for rotating object 100. In such embodiments, position detector 222 receives data from an encoder so that processing system 120 may keep track of the position of object 100. Lighting control 224 is also connected to input/output bus 208 and is used to control the position of lights which may be moved with respect to object 100. Lighting control 224 also controls the intensity of those lights.

The architecture shown for processing system 120 in FIG. 2 is capable of supporting any of the embodiments shown in FIGS. 1–1D. If the object is to be rotated, position controller 220 and position detector 222 provide control of the rotation. Position information about object 100 can be integrated with image data from interface 212 and stored in mass storage 214. Movement and intensity control of the light is controlled by lighting control 224. If an autonomous detector is used, data about the detector position and images captured by the detector can be transferred to processing system 120 via communications interface 218 or removable storage 216. Multiple detector interfaces are provided to control a multiple number of detectors in embodiments which use more than one detector. As described above, a three dimensional surface model can be computed using microprocessor 200 and the data contained in mass storage 214, or, alternatively, the data in mass storage 214 can be transferred to a more powerful image processing system.

Figure 3A:
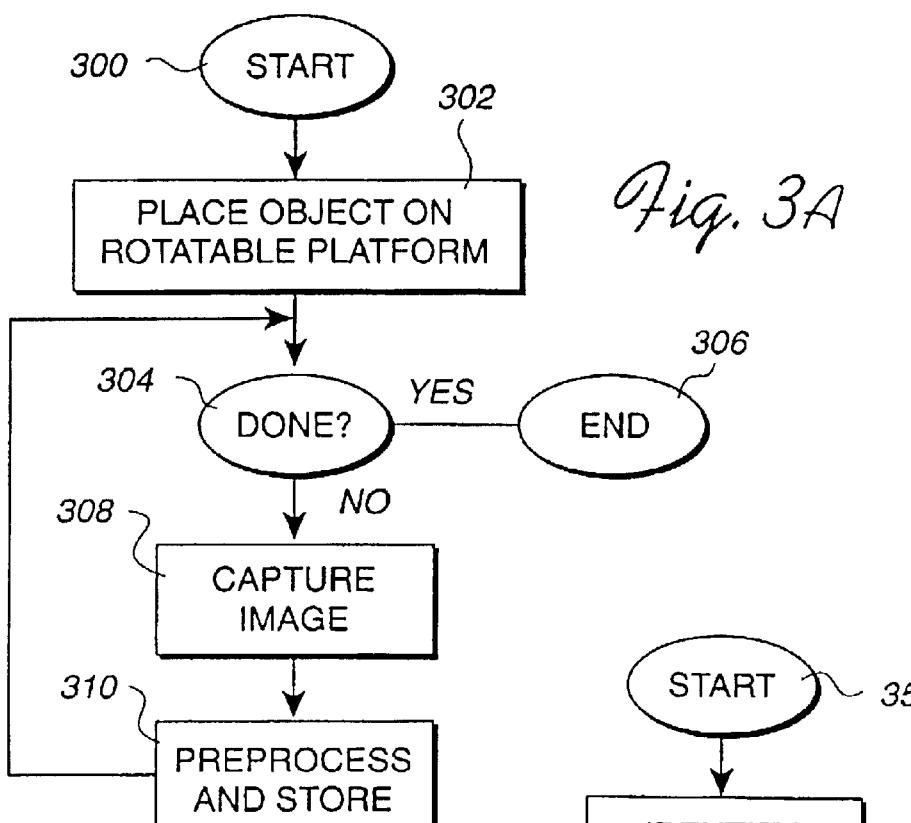
FIG. 3A is a flow diagram illustrating a process of obtaining multiple images of a rotating object.

FIG. 3A is a flow diagram for the process of the present invention of obtaining multiple images of a rotating object. Preferably, the method is implemented on a processing system 120. The process starts at step 300, and the user places the object on the rotatable platform in step 302. The object begins to rotate while it is being imaged by a detector. In step 304, the processor checks whether the required of number images have already been captured or taken. If the required number of images have been captured, then the process is finished at step 306. The two dimensional image data is then ready to be taken to an image processor for generation of a three dimensional surface model. If more images are to be captured, then control is transferred to step 308, and a command is sent to the detector to capture an image. The image is preferably preprocessed and stored in step 310, and control is transferred back to step 304. Once the process depicted in FIG. 3A is complete, a set of two dimensional color images of the object has been obtained at different relative angular displacements between the detector and the object.

Figure 3B:
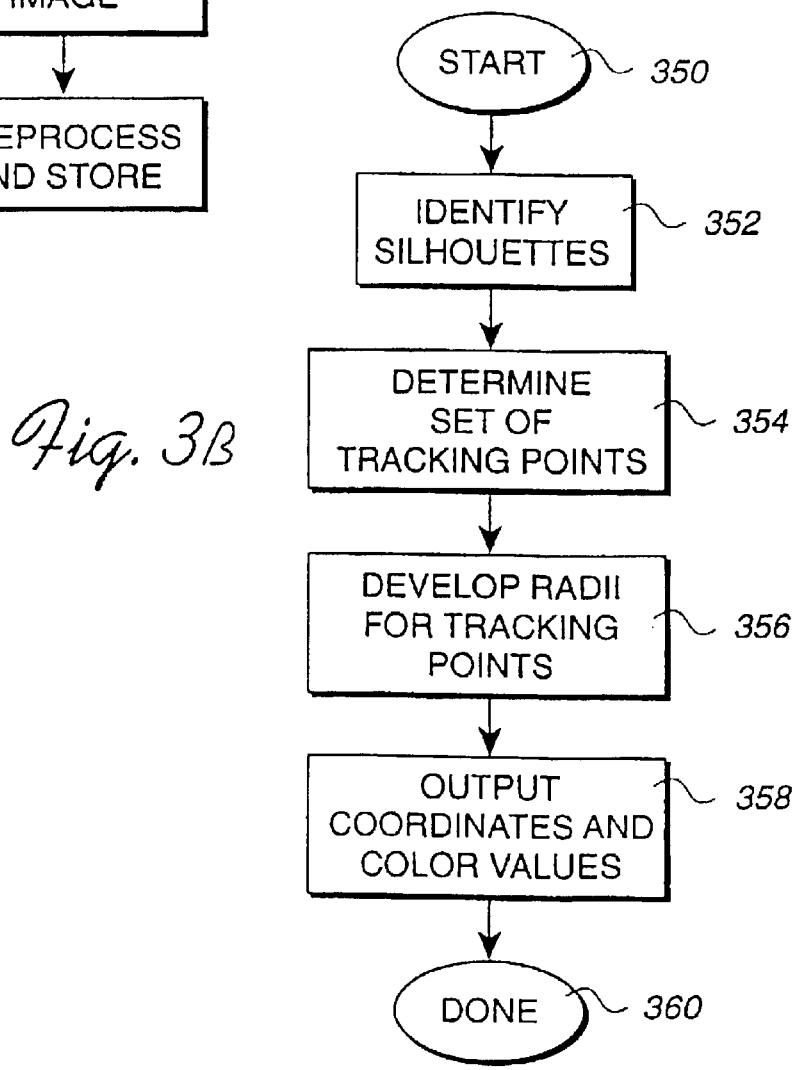
FIG. 3B is a flow diagram illustrating a process for generating three dimensional surface data from the two dimensional images of the object.

FIG. 3B illustrates the process implemented on image processor 130 for generating three dimensional surface data from the two dimensional images of the object developed by the process illustrated in FIG. 3A which was implemented on processing system 120. The process begins at step 350 and in a step 352, the processor identifies the silhouette of the object in each of the two dimensional color images of the object provided by the image acquisition system. This silhouette information will be used to reduce the area in each image that must be processed. In step 354, a set of tracking points is determined within the silhouettes of the object. These tracking points are associated with surface features of the object which are identifiable in different images of the object taken by the optical detector. The portion of the image of the object which corresponds to the identifiable feature is referred to as a trackable patch. Each trackable patch consists of a group of pixels surrounding a geometric point on the surface which is being scanned. The trackable patch is thus a feature associated with and proximal to the geometric point. The patch is distinguishable from adjacent surface locations and therefore trackable. The trackable patch is tracked through a series of images of the object taken at different relative angular displacements between the object and the detector. Step 356 develops a radius from the axis of rotation for each trackable patch which will account for the motion of the trackable patch in the images. The radius of the trackable patch is used to approximate the radius to the geometric point associated with the trackable patch.

Once step 356 is completed, a three dimensional surface consisting of the points which correspond to each trackable patch and interpolations between those points has been generated. In step 358, coordinates of the points corresponding to the modeled surface are output in a standard format. In some embodiments, the raw trackable patch points are output. In other embodiments, points are interpolated between the raw trackable patch points, so that a regular array of points representing a three dimensional surface is generated. Each trackable patch point is already associated with a color value because the trackable patch points are associated with the trackable patch color information. The color value of the trackable patch is simply attributed to the point determined for that patch. Step 358 outputs the coordinates and their color values. The process is completed at 360.

The process of FIG. 3B generates three-dimensional surface data from a set of a two dimensional images in a manner that associates color information with the three dimensional points during the generation of those points. Indeed, the color information is used to identify the points which are tracked thereby enhancing the tracking process. The system does not identify the surface of the object independent of color image information and then match the surface points to color information. In the system depicted in FIG. 3B, optical detectors obtain color images of the object. The 3-D surface points of the object are not determined independently from that color image information. In fact, the surface points of the object are not directly determined, rather, the locations of the features located on the surface are determined. Those surface features include color information. Therefore, the locations of color features are directly determined and do not need to be mapped onto a surface model which is independently generated. The regularly spaced points of the surface model are then generated from the points representing the color surface features by interpolating between the surface feature points.

FIG. 4 illustrates a process 310 that can be performed on the images before they are stored. The process starts at 400. Step 402 analyzes the difference between the current acquired image and the previous acquired image. Step 404 applies a compression technique to the data to reduce the amount of storage space taken up by the data. The process is finished in step 406.

Thus, in this embodiment using process 310, the data is compressed for more compact digital storage.

FIGS. 5A, 5B, and 5C further illustrate the color image pixel data and a compression technique implemented in one embodiment of the invention. FIG. 5A illustrates the vector nature of the color data obtained. In the example, shown, red-green-blue ("RGB") color data is used. This or any other color scheme such as cyan-magenta-yellow black ("CMYK") can be implemented in accordance with the present invention. The three axes shown in FIG. 5A are labeled R, G, and B. Color values can be represented as vectors directed to points in this color space. For example, vector 500 represents the color value of a pixel. The values of R, G, and B are represented by the point to which vector 500 is directed. Vector 500 is the sum of the green component vector 502, the blue component vector 504, and the red component vector 506. Thus, for each point, there is a vector in color space describing the color of the point. The position or pixel location of the point is stored along with the three dimensions of color information which represent the intensities of the three color signals, RGB.

FIG. 5B illustrates an example of what the color data for the color blue looks like at times 0, 1, 2, and 3 for a line of pixels. At time 0, no blue color surface feature is being imaged by the line of pixels. At time 1, a surface feature with a blue component has moved into the position being imaged by the line of pixels, so that 8 blue pixels are observed after X number of no blue pixels are observed. Following the 8 blue pixels, Y pixels of no color are again observed. In this example, only one intensity of blue is shown for the purpose of simplicity. In an actual example, varying intensities of blue could also be observed and recorded. At time 2, the surface feature has moved to the right and now X+2 pixels are observed with no blue and 8 pixels are observed with blue again. Y-2 pixels of no color are observed next. At time 3, the blue feature has moved to the right one more pixel and so X+3 pixels of no color are observed followed by the 8 blue pixels followed by Y-3 pixels of no color.

It can be appreciated that recording the color value of each pixel for each color would generate a large amount of data. FIG. 5C illustrates how the data can be compressed by recording only the changes in the color data, and then using run length encoding for those changes. Run length encoding techniques are well known to those skilled in the art. At time 0, no color is observed, and so the data stored is simply no color or black. At time 1, X pixels are still no color, so that number of pixels is recorded and associated with no change. Next, 8 pixels have changed color to blue and so 8 pixels are recorded as having a positive blue change. Finally, the remaining Y pixels have not changed, so Y pixels, no change is recorded. At time 2, the X pixels on the left side which had no color have not changed and so X pixels are recorded as having no change. Since the blue image has shifted two pixels to the right, the next two pixels which were formerly blue now have no color. Both pixels are recorded as two negative blue pixels since the color change for them was negative blue representing the loss of blue color. The next 6 pixels were formerly blue at time 1 and remained blue at time 2 and so no change is recorded for the next 6 pixels. The next two pixels were formerly not blue and have become blue. Therefore, the next two pixels are recorded as having positive blue value representing a positive blue change between time 2 and time 1. The next Y-2 pixels were blank during time 1, and remain blank during time 2, so no change is recorded for the next Y-2 pixels.

At time 3 the blue feature has moved one more pixel to the right. The first X+2 pixels in the linear array had no color at time 2 and still have no color at time 3. Therefore, no change is recorded for the first X+2 pixels. The next pixel was formerly blue but, since the blue feature has moved one pixel to the right, that pixel is now has no color. Therefore a negative blue color change is recorded for that pixel. The next 7 pixels were blue at time 2 and remain blue at time 3. Therefore, no color change is recorded for those 7 pixels. The next pixel had no blue color at time 2 and has a blue color component at time 3. A color change of positive blue is therefore recorded for that pixel. Finally, the Y-1 remaining pixels were formerly blank at time 2 and remain blank at time 3 and so no change is recorded for those Y-1 pixels.

From this example, it can be seen that as a surface feature moves across the pixels at successive times, it is possible to represent the image of the feature by recording only the changes in color values for each pixel at each successive time. Successive pixels which do not change color can be simply noted without the need to store three dimensions of color value for each individual pixel. This is only one example of a data compression scheme which is used in one embodiment of the present invention. Other compression techniques can be used as alternatives to or can be used in combination with this compression technique. It is only required that the data be stored in a format which will be accessible and expandable later on for processing of the two dimensional images to determine a three dimensional surface. Alternatively, if storage capacity is not a problem, data compression can be eliminated.

In other embodiments of the invention, surface attributes other than color are derived and stored in connection with the three dimensional surface data. For example, specularity, emissivity, and absorption can be derived from the surface geometry and the orientation of the local surface in multiple views at multiple angles with respect to the surface. In certain embodiments, these attributes also aid in distinguishing trackable patches.

FIG. 6 illustrates the process 352 that identifies the silhouette of the object in each image. The process starts at 600. Step 602 tests whether the process is finished with the images. If the processor is finished with the images, then the process terminates at step 604. If more images remain to be processed, step 606 applies a filter kernel to the image which is herein incorporated by reference. As is known to those skilled in the art, a filter kernel is a set of coefficients which is convolved with an image (an XY array of pixels). Certain filter kernels, such as the Canny and Sobel kernels, highlight edges by producing a high correlation at locations which represent edges in images. Edge detection using filter kernels is described in: "On Detecting Edges" by Nalwi, PAMI, Chapter 8, pp. 699–714; "Finding Lines and Edges in Images" by Canny, MIT Technical Report TR-720, 1984; "On Calibrating Computer Controlled Cameras for Perceiving 3D Scenes" by Sobel Artificial Intelligence, Vol. 5, pp. 185–198, 1974; and "A Comprehensive Approach to Edge Detection" by Canny, PAMI, Chapter 8, pp. 679–698, 1986:

By correlating the filter kernel with the image at all points, it is possible to determine the edge of the object for the object silhouette, by analyzing the correlation value. The silhouette edges are determined in step 608. Control is transferred back to step 602 to check whether there remain other images to be processed for silhouettes.

The purpose of determining the silhouette of the image is to constrain the amount of area over which surface features are searched for and identified for the object. A flying insect or a noise spike recorded by the detector may exist outside the area of the object shown in a given image. Noise spikes or insects may appear to be a good candidate to a be a trackable surface feature, but if the silhouette or edge of the object has been determined and the insect or noise spike is outside of that edge, then it will not be designated as a possible trackable surface feature. This simplifies the search for surface features and reduces computer processing of the image data by limiting the area to be searched and also prevents extraneous surface feature points from being identified and mapped as surface points. In certain embodiments, the search for surface features is further limited to an area within the silhouette as is described below.

FIG. 7 illustrates further detail regarding process 608 of FIG. 6 wherein silhouette edges are found along each scan line. The process starts at 700. In step 702, the processor begins at the left edge of the image and correlates the kernel with the pixels of the image to find a correlation maximum which corresponds to a potential left edge. In step 704, the processor moves in from the right edge of the image and correlates the kernel with the image data to find potential right edges. In step 706, a heuristic algorithm is used to determine left and right edges of the object. In this step, edges are distinguished from bugs or blips by the nature of the edge. In one embodiment this is accomplished by distinguishing between the continuous nature of an edge verses the isolated spatial nature of a spec or blip. Any alternative heuristic algorithm which exists for determining edges in such instances may be used within the scope of the present invention.

Figure 8:
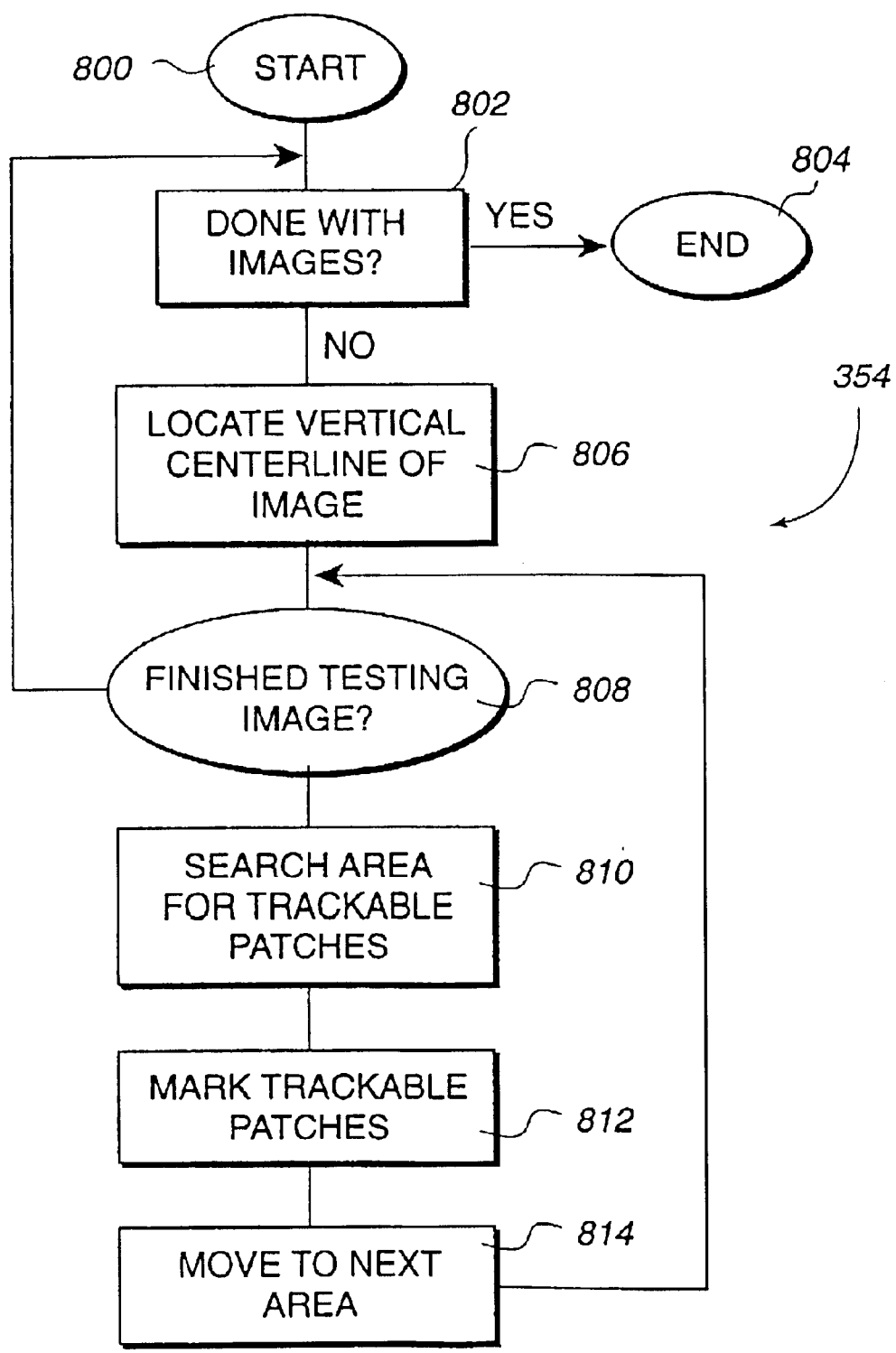
FIG. 8 is a flow diagram illustrating a process for determining e a set of trackable patches.

FIG. 8 illustrates the process 354 of FIG. 3B implemented to determine a set of trackable patches. The process starts at 800. Step 802 determines whether the processor is finished with all images. If the processor is finished, the process ends at step 804. If the processor is not finished, control is transferred to step 806 and the processor locates the vertical center line of the image being processed. Next, the processor steps through the image to look for trackable patches starting at the center of the image and searching outward.

The size and dimensional nature of the trackable patches varies in different embodiments. In certain embodiments, trackable patches are searched for in individual scan lines, so that the trackable patches are one dimensional. In other embodiments, the trackable patches are searched for across several scan lines at once so that the patches are two dimensional. The size of the trackable patch searched for is fixed in some embodiments at a certain pixel area, for example 10×10. In other embodiments, the area of the trackable patches is not predetermined and may vary in size for different areas of the image. This enables the system to be flexible and select trackable patches of an optimal size for the type of trackable features found on the object. In general, when an "area" is referred to as being checked for trackable patches, any size or dimension area is intended, including a line of pixels.

Step 808 checks whether the processor is finished testing all parts of the image. If the processor is finished, then control is transferred back to step 802. If the processor is not finished, then the next unsearched area of the image is searched and analyzed to determine if it contains any trackable patches in step 810.

A number of ways exist for determining whether an area or section of the image is a good candidate for a trackable patch. A good trackable patch is a series of pixels which have RGB vector values which are readily identifiable and distinguishable from the RGB vector values in other areas of the image. Therefore, a distinctive coloration of a patch is an asset to its trackability. The trackable patch RGB vector values will be correlated with the RGB values in other images which represent other views of the object. If the trackable patch is readily distinguishable, then the correlation will yield a distinct spike at the new location of the trackable patch in the other images and the patch will be successfully found or tracked.

A number of methods exist for determining how unique or identifiable a given area in an image is, and therefore whether the area is a good candidate to be designated as a trackable patch. One method is to compute the variance values of the pixels within the area. A high variance value will indicate that the pixel values are changing and thus will at least be readily distinguishable from a solid or unchanging color background. A more sophisticated method is to convolve different kernels with the image area being tested to judge the quality of the surface features and its likelihood of being trackable. Standard kernels such as those defined in Canny and Sobel, supra, can be defined as a standard kernel used to check for trackable patches. Alternatively, a learning or smart system in some embodiments has the capability of developing customized kernels on the fly which are optimized for the type of surface features found on the object being scanned. The size of trackable patches, and the kernels used to identify them may be held constant or may be varied.

As noted above, step 806 locates the vertical center line of the image. The system begins at the vertical center line of the image and the search proceeds outward for trackable patches. The reason that trackable patches are first looked for at the center line of the image is that surface features are most likely to be completely and accurately sensed without distortion when they are observed head-on by the detector. However, areas to the left or right of the centerline can also be used. As surface features rotate away from the center line of the object, they will eventually pass out of the view of the detector. Before passing out of the view of the detector, the surface features will begin to become partially obscured and distorted as they are viewed obliquely by the detector. For example, at a 45 degree angle, a circle on the surface of the object will appear to the detector to be an oval. Obscured and distorted surface features are more difficult to accurately track because they change between images and it is also difficult to define a consistent location point for them.

Figure 8A:
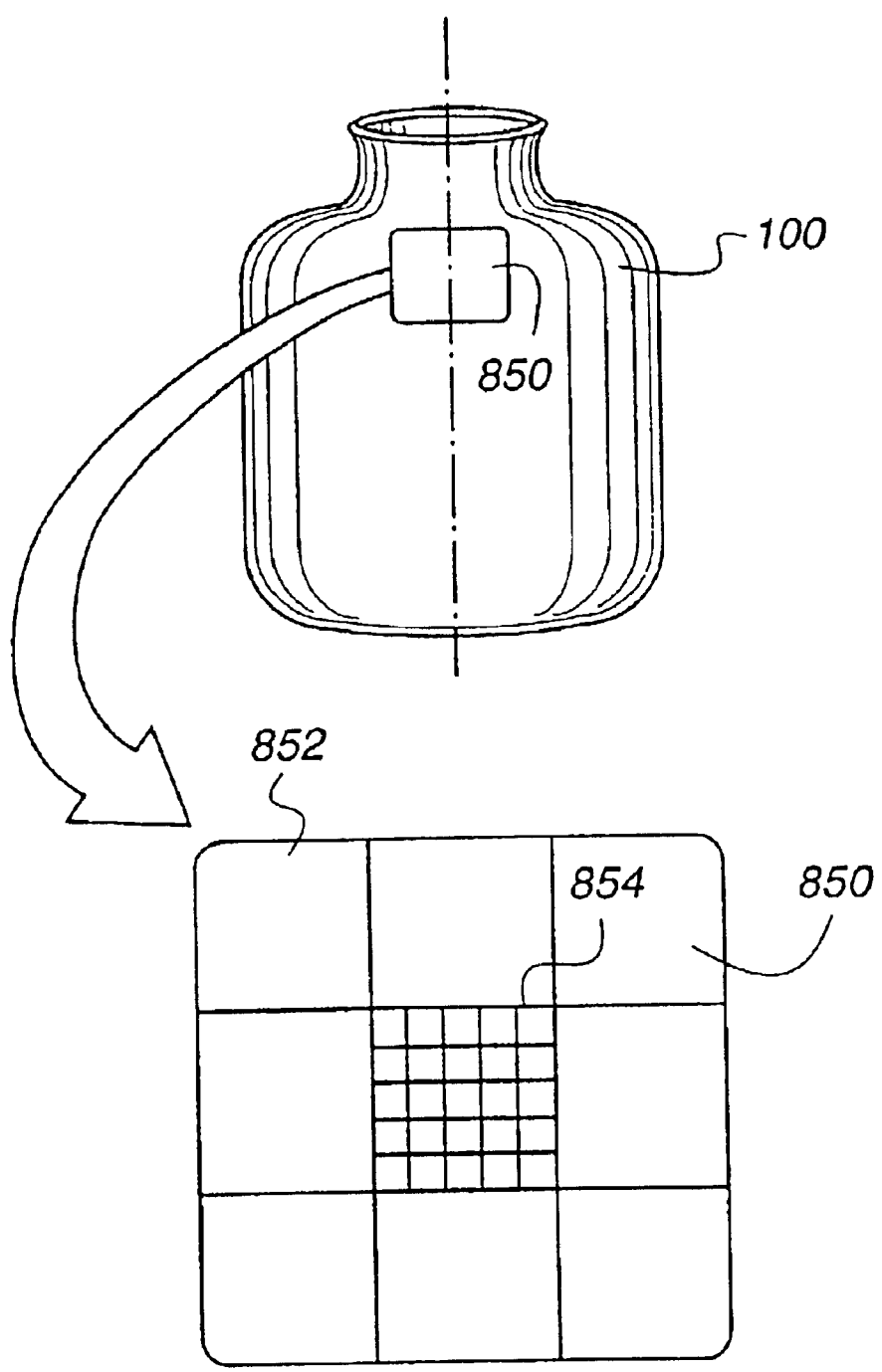
FIG. 8A illustrates how to search an image for trackable patches.

In step 812, the processor marks the trackable patches found in the area searched. This includes storing the color data for the pixels in the patch and storing the location of the patch. In step 814, the processor increments a distance away from the center line to define a new area to search and control is transferred to step 808. As noted above, step 808 determines if the image is finished being tested. In one embodiment, this is done by checking whether the entire area within a maximum distance from the center has been searched. The distance from the center line over which the processor will search for trackable patches can also be varied. FIG. 8A illustrates an image being searched for trackable patches by the process 810 of FIG. 8. The top portion of FIG. 8 illustrates object 100 and area 850 which is magnified below. Area 850 consists of a number of areas or sections 852 which, in turn, consists of pixels 854. Area 850 is located at the center line of object 100 and so will be tested by the processor on its first pass. Each section 852 of area 850 will be checked to determine whether it is a good candidate for a trackable patch. The vector color data from the pixels 854 is checked to see if it contains characteristics which are expected to be readily identifiable and distinguishable from other areas.

As noted above, the processor begins at the center line, $C_i$ and checks outward for good trackable patches because features are most likely to be identifiable at the center. In other embodiments, the computer can check for patches starting with a location other than the center of the image. In FIG. 8A, the trackable patches are shown as squares which have a predetermined area or number of pixels, in this case, five by five. In other embodiments, the trackable patches have variable or irregular sized areas. Different predefined sized areas can also be used. The important feature is that patches on the surface are identified in the image so that the points corresponding to those patches can be determined and tracked in other images.

Figure 9:
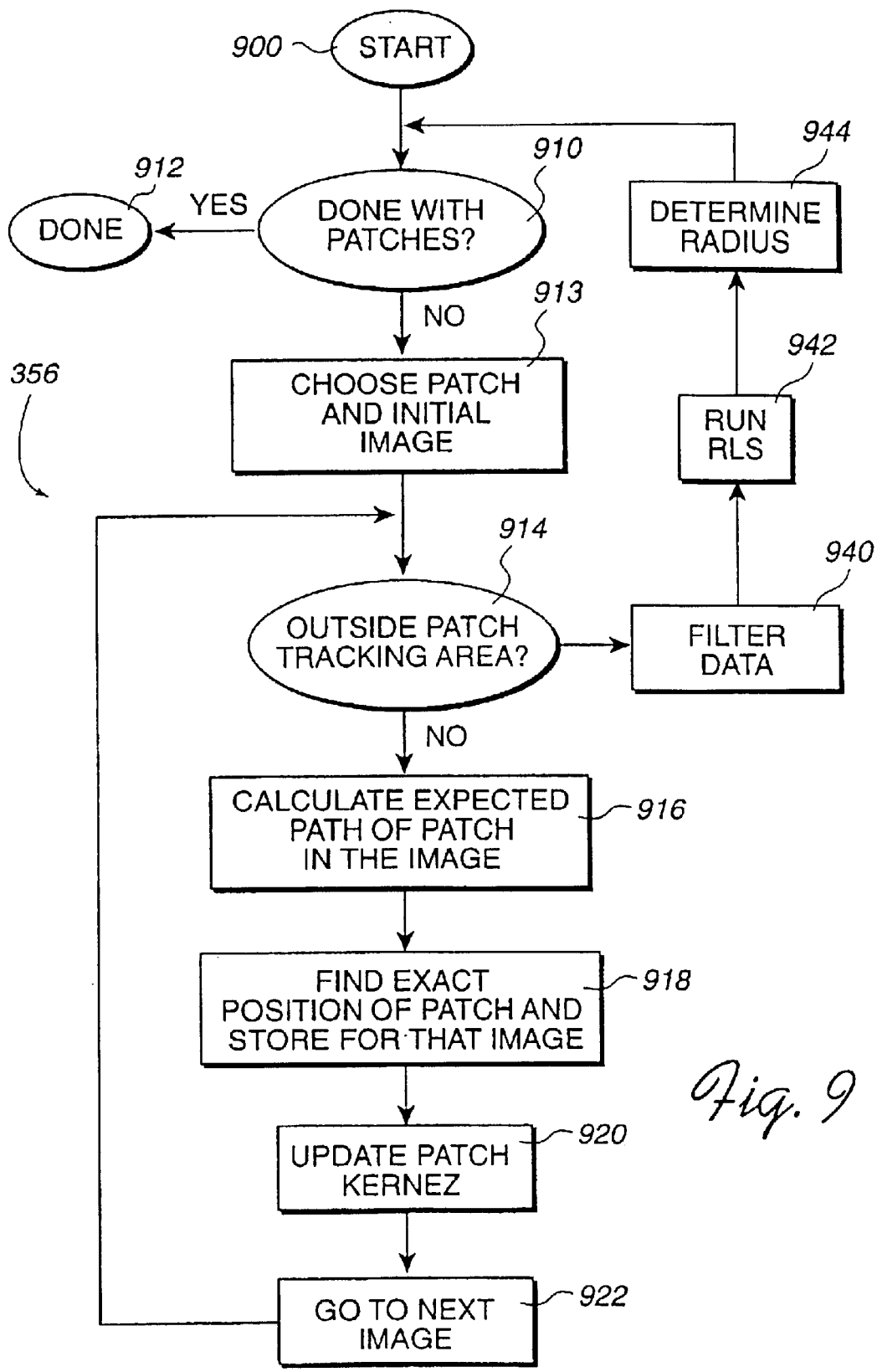
FIG. 9 is a flow diagram illustrating a process for determining the radius of the location of patches on the surface of the object as the object is rotated.

FIG. 9 illustrates the process 356 of FIG. 3 implemented to determine the radius of the location of patches on the surface of the object as the object is rotating. As noted before, a set of two dimensional images of the object are acquired as the object rotates. These images include surface features of the object located in a two-dimensional space and it is desired to derive the three-dimensional location of the features from the two-dimensional information in the images. Features which are likely to be trackable are designated as trackable patches.

A three dimensional surface is derived by locating each of the patches. This is done by tracking the patch across a number of views which represent angularly rotated images of the object. As the object is rotated (or virtually rotated if multiple detectors or a movable detector are used—whenever the object is described as being, rotated, it should be understood that virtual rotation is also included), features which are located a longer distance from the axis of rotation move a greater distance than features which are located a shorter distance from the axis of rotation. A radius from the axis of rotation of the object is derived for each trackable patch which will account for the movement of the trackable patch in the different images.

The process starts at 900. Step 910 determines whether the processor is finished with all patches. If the processor is finished with all patches, then control is transferred to step 912 and the process ends. If more patches remain to be processed, then control is transferred to step 913 and a patch is chosen, together with an initial image in which the patch is found. In step 914, the processor checks whether the patch lies outside of the tracking area within the image. If the patch is not outside the tracking limit, then the processor calculates the expected path of the patch in the image in step 916. If the image is the initial image to be processed, then the expected path will simply be the initial location of the patch in that image.

Next, in step 918, the processor finds the exact position of the patch in the image and stores that position for that image. In step 920, the processor updates the patch kernel. The reason for updating the patch kernel is that the patch will change as it moves across the image from the center towards the tracking limit. The tracking limit defines the area of the image in which patches will be tracked. This area is bounded in one embodiment across a 90 degree range. Although the tracking limit is set so that features within the limit remain relatively constant, it is possible near the edges of limit that the image of the patch will change more and more rapidly with angular displacement. The changing of the image of the patch makes it difficult to track the patch and increases the possibility of error.

Although within the region over which the patch is tracked, the patch may change considerably from the center of the region to the edge of the region, it is fortunate that, in many cases, the patch will change in a relatively continuous manner. Therefore, although the patch when viewed at the edge of the patch tracking region will appear very different than the patch when viewed at the center of the patch tracking region, the patches viewed in areas of the patch tracking region which are close to each other will be similar. To take advantage of this, the kernel used to search for the patch is changed with each successive image so that the patch searched for in each image is actually the patch which was found in the last image, not the initial patch which was defined in the center image. This makes it much easier to correlate the patch and to successfully track the patch.

Once the patch kernel is updated in step 920, the processor obtains the next image in step 922 and control is transferred back to step 914. When step 914 determines that the image limit has been reached, control is transferred to step 940. In step 940, the data is filtered or smoothed. Filtering and smoothing consists of applying known standard statistical and filtering techniques for cleaning up the data and perhaps rejecting bad data points. The data consists of the positions determined across a plurality of images for each patch. This data is associated with the color pixel information for each patch. In step 942, a recursive least square ("RLS") algorithm is run to fit the points to a curve. In step 944, the radius from the axis of rotation of the object to the surface of the object at the trackable patch is determined which will account for the motion of the trackable path across the images. Control is then transferred to step 910 which proceeds to the next patch or, if all patches have been processed, control is transferred to step 912 and the process ends.

At the completion of the process 356, three-dimensional surface information about the object has been obtained. That three-dimensional surface information is integrally linked to color data because the vector color data of the trackable patch was used to find the patch in each successive image so that the motion of the patch could be determined as the object rotated in different images. The radius of the surface portion containing the trackable patch combined with the two-dimensional pixel information obtained from the optical detector is then be transformed to provide a three-dimensional representation of the point in any desired coordinate system.

Figure 9A:
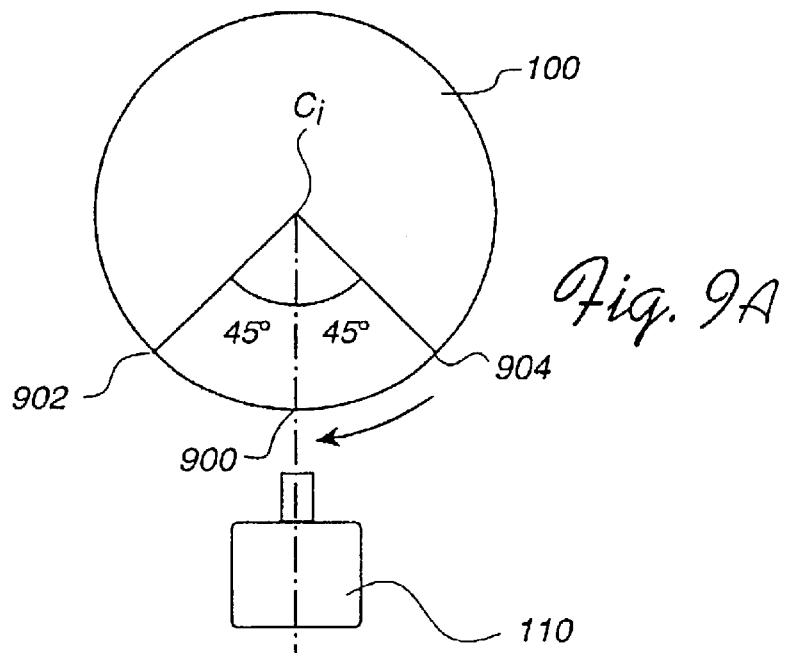
FIG. 9A illustrates a set of patch tracking limits.

FIG. 9A illustrates a set of patch tracking limits as used by step 914 of FIG. 9. Detector 110 views object 100 straight-on at point 900 on the surface of object 100, i.e. along the centerline $C_i$ of the object. As noted above, surface features and trackable patches are viewed with the least amount of distortion at this head-on angle. As the trackable patch is rotated away from point 900, it appears to detector 110 to change shape and becomes distorted. In one embodiment, the judgment is made that it is not worthwhile to attempt to track trackable patches beyond point 902 and point 904, which are located at a 45 degree angular limit from point 900. The tracking limit in each image will be a vertical line corresponding to this angle. In other embodiments, other limits are chosen. Limits can also be learned by the system or determined based on the nature of the data so that no predetermined limits need to be set.

Figure 9B:
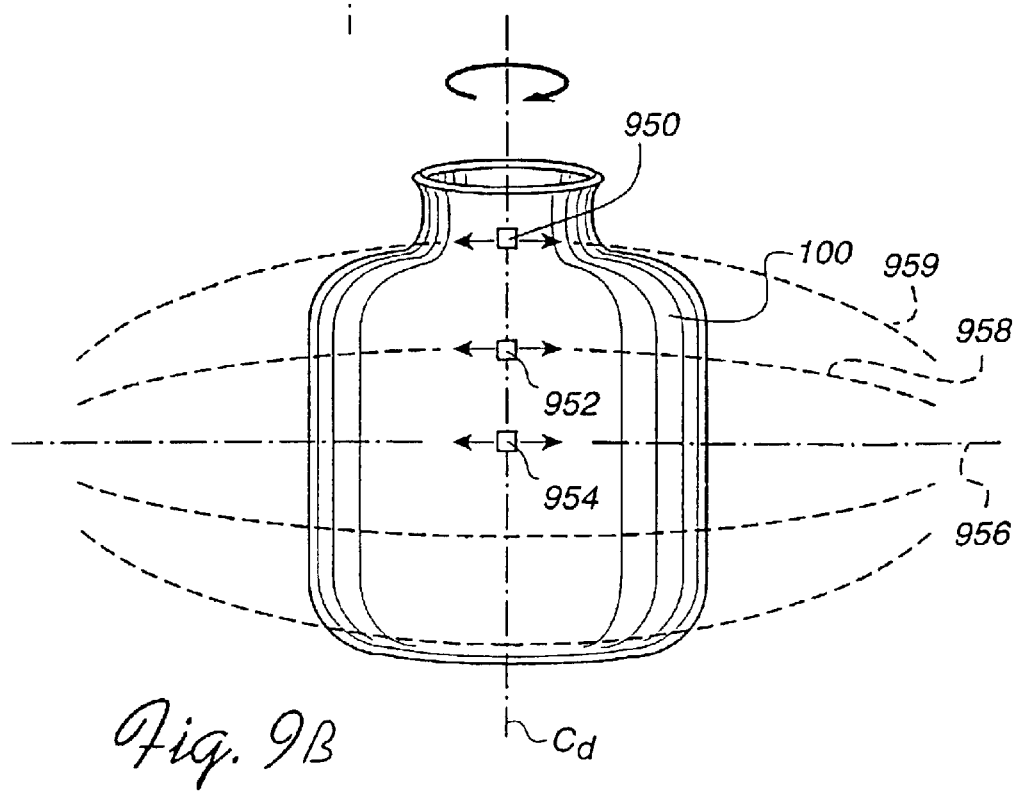
FIG. 9B illustrates the motion of trackable patches in different images with different angular displacements.

FIG. 9B illustrates the motion of trackable patches across different images with different angular displacements as calculated in step 916 of FIG. 9. Object 100 in this image is a symmetrically shaped vase so that the silhouette of object 100 remains constant but features on the surface of object 100 move as object 100 is rotated. Object 100 is shown with a trackable patch 950, a trackable patch 952 and a trackable patch 954. Trackable patch 954 is shown located at the exact intersection of the horizontal and vertical center lines of the detector view. When an angularly displaced image of object 100 is analyzed to find trackable patch 954, it is not necessary to search the entire image for the trackable patch in a random manner. Trackable patch 954 is expected to move along a line 956 and so the search for trackable patch 954 in a successive image of object 100 should be executed along line 956. Note that line 956 is straight because trackable patch 954 is located at the center point of the detector view in the first image. Similarly, trackable patch 952 is expected to follow a line 958 in images in which trackable patch 952 is angularly displaced, and a line 959 is the path which trackable patch 950 is expected to follow in angularly displaced images. Line 958 is curved, unlike straight line 956, because line 958 does not pass through the center $C_d$ of the detector view. Features not located in the center are expected to follow epipolar trajectories as is known to those skilled in the art. Line 959 is even more curved than line 958 because line 959 is further from the center of the detector view than line 958. Thus, it is possible to quickly locate the trackable patches in angularly displaced images because the expected path of the trackable patch is known from the epipolar trajectories as object 100 rotates.

The distance the trackable patch moves along its expected path for a given angular displacement, or the speed of movement of each trackable patch as the object rotates, is not known. The change in position will vary with the radial distance of the trackable patch from the axis of rotation of the object. This is how the radius from the axis of rotation of the object is determined.

Figure 9C:
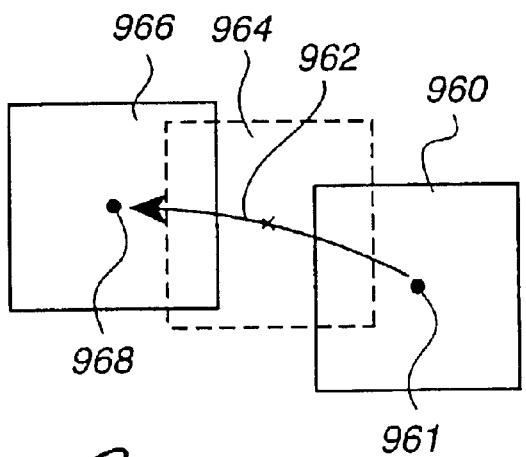
FIG. 9C illustrates the determination of an exact position of the patch in an image.

FIG. 9C illustrates the determination of an exact position of the patch in an image as determined by step 918 of FIG. 9. Trackable patch 960 was observed in a former image and its location is defined by its center point 961. The expected path 962 of center point 961 is known. The processor searches for a good correlation of trackable patch 960 with the image data for patches along expected path 962. Patch 964, represented by a dashed line, does not present a good a correlation as patch 966, which is represented by a solid line. Patch 966 is determined to be the patch and the location of the trackable patch in the new image is determined to be point 968 which represents the location of patch 966.

In this example, the center point of the patch is used to represent the location of the entire patch. This approach works as long as the patch is small. In other embodiments, multiple points are defined for a patch or a weighted average point which is based on the colors of the pixels which make up the patch is defined for the patch. In the illustrated embodiment, the location of the patch in the different images and the motion of the patch in the different images which are angularly displaced is represented by the motion of the center point 961 which represents the center of trackable patch 960 to point 968 which represents the center of the angularly displaced patch 966.

Figure 9D:
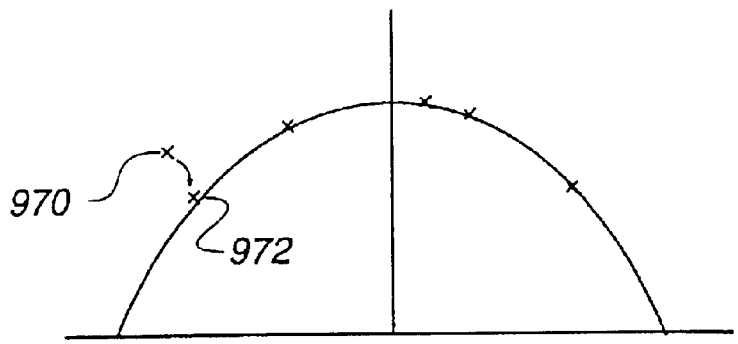
FIG. 9D is a graph which illustrates the filtering of raw data points.

FIG. 9D illustrates the filtering of the raw data points as performed in step 940 of FIG. 9. Point 970 is shown as being inaccurately derived because it is located away from the expected curve. After the filtering process, point 970 has been moved to point 972 which lies in the expected path. A number of standard filtering techniques can be used. The frequency of the rotation of the object is known and all surface feature motion should occur at a spatial frequency corresponding to that frequency. In one embodiment, a brick wall filter is used to filter the data to remove motion occurring at other frequencies.

In embodiments in which the object is not rotated at a constant frequency, or where views of the object are obtained without rotating the object, (for example, by using multiple cameras) then the spatial frequency of the occurrence of features in images will not correspond to a frequency of rotation of the object. In such embodiments, the raw data is filtered using a modified Z-transform method. Modified Ztransforn methods are used to filter data when the displacement is non-uniform.

Figure 9E:
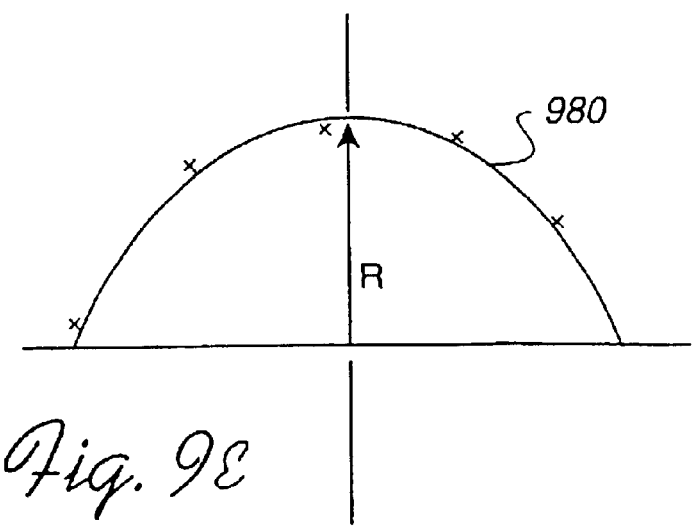
FIG. 9E is a graph which illustrates how the radius is determined from the points representing the path of the trackable patch across angularly displaced images.

FIG. 9E illustrates how the radius is determined from the points representing the path of the trackable patch across angularly displaced images and corresponds to steps 940 and 942 of FIG. 9. FIG. 9E is a plot of curve 980 which represents the first derivative of the distance, or the speed of the patch as it is angularly displaced from the center of the image versus the angular displacement of the patch from the center. When the angular displacement is zero, the displacement of the trackable patch is zero and its linear speed is a maximum value. As the angular displacement increases, the speed will change according to the cosine of the angle of displacement.

The radial distance, R, of the patch from the axis of rotation of the object can be determined from a graph of the speed of the patch as shown on curve 980. Note that the frequency of this curve is well known so the data can be filtered and the amplitude of the curve can be accurately determined. After fitting the actual rate of displacement of the trackable patch to the cosine curve, the amplitude of the cosine curve is determined. The radius of the trackable patch is derived from the amplitude. Other processing methods are used in different embodiments to derive the radius. In one embodiment, the displacement of the patch, not the velocity is fit to a sine curve. An embodiment can use any processing method available to derive a radius which accounts for the patch motion.

Figure 10:
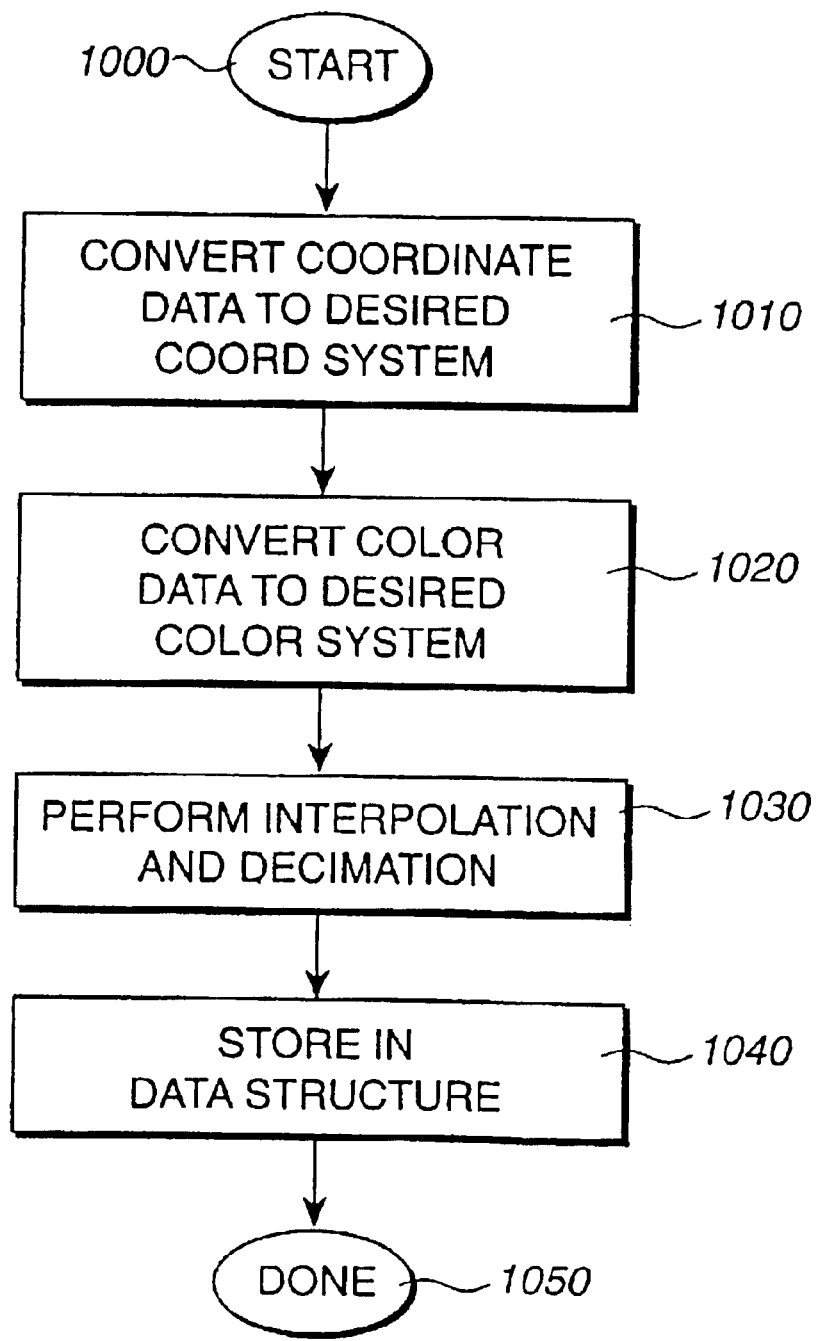
FIG. 10 is a flow diagram illustrating the post processing that occurs once the radius of the trackable patch is known.

FIG. 10 illustrates the post processing process that can occurs once the radius of the trackable patch is known. The process begins at step 1000. In step 1010, the radial distance data for the trackable patches is combined with the two-dimensional trackable patch data from the images and converted to a desired coordinate system. In step 1020, the color data associated with the trackable patch is converted to a desired color system for storage. Step 1030 performs interpolation and decimation of the points. In one embodiment, all of the trackable patch points are interpolated so that a regular array of surface points can be defined to model the surface of the object. In step 1040, the points derived in step 1030 and the color values associated with those points in the form determined by step 1020 are stored in a data structure. The process is completed at 105.

In this process, it is especially important to note that no matching of color data with three-dimensional position data is ever required. The color data for the trackable patches is already associated with the trackable patches which define the surface points of the object, and, in fact was used as an aid in calculating the three dimensional locations of those points. When the trackable patch points are decimated and interpolated, the color values are likewise interpolated. No misregistration of color occurs because the color information is already associated with the patches whose locations are determined to model the surface of the object.

While this invention has been described in terms of several preferred embodiments, there are alterations, permutations, and equivalents which fall within the scope of this invention. It should also be noted that there are many alternative ways of implementing both the process and apparatus of the present invention. It is therefore intended that the following appended claims be interpreted as including all such alterations, permutations, and equivalents as fall within the true spirit and scope of the present invention.

What is claimed is:

1. A method of scanning a three-dimensional object, including the steps of:
   a) providing a view detector;
   b) providing a plurality of mirrors arranged and positioned to project views of the three dimensional object to the view detector;
   c) rotating the three dimensional object;
   d) using the view detector to develop a plurality of images of the three dimensional object, said plurality of images being taken from the projected views from the plurality of mirrors, the plurality of images depicting a plurality of surface portions of the object to be scanned;
   e) computing 3-D coordinate positions and related image information of said plurality of surface portions of the three dimensional object from the plurality of images whereby a three dimensional image of the object to be scanned can be developed that includes both shape and surface image information.

2. A three dimensional digital scanner comprising:
   a) a multiple image detector responsive to a broad spectrum of light, said image detector being operative to develop a plurality of images of a three dimensional object to be scanned, said plurality of images being taken from a plurality of relative angles with respect to said object, said plurality of images depicting a plurality of surface portions of said object to be scanned;
   b) a digital processor including a computational unit said digital processor being coupled to said image detector;
   c) said digital processor being operative to measure and record for each of said plurality of images, position information including the relative angular position of the detector with respect to the object;
   d) said digital processor being operative to use said position information to develop with said computational unit 3-D coordinate positions and related image information of said plurality of surface portions of said object;
   e) whereby a three dimensional image of said object scanned can be developed by said digital processor that includes both shape and surface image.

3. A three dimensional digital scanner comprising:
   a) a multiple image detector responsive to a broad spectrum of light, said multiple image detector being operative to develop a plurality of images of a three dimensional object to be scanned, said plurality of images being taken from a plurality of relative angles with respect to said object, said plurality of images depicting a plurality of surface portions of said object to be scanned; and
   b) a digital processor including a computational unit, said digital processor being coupled to said detector means, said digital processor being responsive to said plurality of images arid operative to develop with said computational unit 3-D coordinate positions and related image information of said plurality of surface portions of said object;
   c) said digital processor being operative with said computational unit to derive from the surface geometry and the orientation of a local surface in multiple views at multiple angles with respect to the surface, surface attributes other than color in said plurality of images;
   d) whereby a digital representation of said three-dimensional object can be developed that includes shape and surface image information including color and surface attributes other than color.

4. The apparatus of claim 3 wherein the surface attributes other than color include specularity.

5. The apparatus of claim 3 wherein the surface attributes other than color include emissivity.

6. The apparatus of claim 3 wherein the surface attributes other than color include absorption.

* * * * *